United States Patent
Do et al.

(10) Patent No.: US 10,060,285 B2
(45) Date of Patent: Aug. 28, 2018

(54) VARIABLE VANE CONTROL SYSTEM

(71) Applicant: United Technologies Corporation, Hartford, CT (US)

(72) Inventors: Logan H. Do, Canton, CT (US); Richard L. Sykes, East Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 301 days.

(21) Appl. No.: 14/774,815

(22) PCT Filed: Feb. 21, 2014

(86) PCT No.: PCT/US2014/017614
§ 371 (c)(1),
(2) Date: Sep. 11, 2015

(87) PCT Pub. No.: WO2014/189574
PCT Pub. Date: Nov. 27, 2014

(65) Prior Publication Data
US 2016/0040550 A1     Feb. 11, 2016

Related U.S. Application Data

(60) Provisional application No. 61/873,521, filed on Sep. 4, 2013, provisional application No. 61/778,678, filed on Mar. 13, 2013.

(51) Int. Cl.
*F04D 29/56*     (2006.01)
*F01D 17/12*     (2006.01)
(Continued)

(52) U.S. Cl.
CPC .............. *F01D 17/12* (2013.01); *F01D 9/02* (2013.01); *F01D 17/02* (2013.01); *F01D 17/162* (2013.01);
(Continued)

(58) Field of Classification Search
CPC ........ F01D 17/162; F02C 9/20; F04D 27/002; F05D 2250/90
See application file for complete search history.

(56) References Cited

U.S. PATENT DOCUMENTS

| | | |
|---|---|---|
| 5,190,439 A | 3/1993 | Das |
| 5,224,337 A | 7/1993 | Morishita et al. |

(Continued)

FOREIGN PATENT DOCUMENTS

| | | |
|---|---|---|
| EP | 0909880 | 4/1999 |
| EP | 1988258 | 11/2008 |

OTHER PUBLICATIONS

Supplementary European Search Report for Application No. 14801625.6 dated Dec. 9, 2016.
(Continued)

*Primary Examiner* — Ninh H Nguyen
(74) *Attorney, Agent, or Firm* — Carlson, Gaskey & Olds, P.C.

(57) ABSTRACT

A method of controlling a variable vane assembly includes the steps of sensing a first angular deflection of a first array of variable vanes about a first vane axis, and a second angular deflection of a second array of variable vanes about a second vane axis, the first array of variable vanes axially spaced from the second array of variable vanes, and adjusting the angular deflection of one of the first and second arrays of variable vanes, based on the sensed angular deflections from the other of the first and second arrays of variable vanes. A compressor including the variable vane assembly and a method of operating the variable vane assembly for a compressor are also disclosed.

17 Claims, 4 Drawing Sheets

(51) Int. Cl.
*F01D 17/16* (2006.01)
*F04D 27/02* (2006.01)
*F02C 9/20* (2006.01)
*F01D 9/02* (2006.01)
*F01D 17/02* (2006.01)

(52) U.S. Cl.
CPC ............ *F02C 9/20* (2013.01); *F04D 27/0246* (2013.01); *F05D 2220/3216* (2013.01); *F05D 2240/12* (2013.01); *F05D 2270/44* (2013.01)

(56) References Cited

U.S. PATENT DOCUMENTS

| | | | | |
|---|---|---|---|---|
| 6,164,057 | A | * | 12/2000 | Rowen ...................... F02C 9/54 60/39.27 |
| 6,735,955 | B2 | | 5/2004 | Mannarino |
| 6,758,044 | B2 | | 7/2004 | Mannarino |
| 7,232,287 | B2 | * | 6/2007 | Regunath ............. G05B 13/021 415/160 |
| 7,927,067 | B2 | | 4/2011 | Rajamani et al. |
| 8,191,410 | B2 | * | 6/2012 | Hansen ................. G01M 15/14 73/112.05 |
| 8,276,362 | B2 | | 10/2012 | Suciu et al. |
| 8,348,600 | B2 | | 1/2013 | Norris et al. |
| 8,452,516 | B1 | | 5/2013 | Rose et al. |
| 8,770,912 | B2 | * | 7/2014 | Minto ..................... F01D 9/041 415/1 |
| 9,109,461 | B2 | * | 8/2015 | Takahashi ............... F01D 5/142 |
| 9,500,200 | B2 | * | 11/2016 | Rittenhouse .............. F02C 9/20 |
| 2003/0011199 | A1 | | 1/2003 | Wickert et al. |
| 2009/0226305 | A1 | | 9/2009 | Wong et al. |
| 2010/0021285 | A1 | | 1/2010 | Rowe et al. |
| 2011/0173988 | A1 | | 7/2011 | Sweet et al. |
| 2012/0134783 | A1 | * | 5/2012 | Davidson ............ F04D 27/0246 415/148 |
| 2012/0171020 | A1 | | 7/2012 | Peck et al. |
| 2012/0215417 | A1 | | 8/2012 | Boyer et al. |
| 2012/0269613 | A1 | | 10/2012 | Mills et al. |
| 2013/0039736 | A1 | | 2/2013 | Waugh et al. |
| 2013/0058763 | A1 | | 3/2013 | Keegan et al. |
| 2013/0084179 | A1 | | 4/2013 | Mantese et al. |
| 2014/0178176 | A1 | * | 6/2014 | Takahashi ............... F01D 11/24 415/1 |

OTHER PUBLICATIONS

International Preliminary Report on Patentability for PCT Application No. PCT/US2014/017614, dated Sep. 24, 2015.
International Search Report and Written Opinion for PCT Application No. PCT/US2014/017614, dated Dec. 24, 2014.

* cited by examiner

VARIABLE VANE CONTROL SYSTEM

BACKGROUND

This disclosure relates to a variable vane drive system for a gas turbine engine.

A gas turbine engine typically includes a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive at least the compressor. The compressor section typically includes low and high pressure compressors, and the turbine section includes low and high pressure turbines. Some gas turbine engines include a fan section driven by the turbine section.

Some areas of the engine may include variable vanes. The compressor, for example, may include multiple stages of variable vanes. In some compressor designs, vanes can only be scheduled at first and second positions. The first and second positions are determined by on-ground testing. During flight, the vanes are moved between the first and second positions based on the engine's mode of operation. The vanes may experience wear on primary air-contacting faces in the first and second positions and may need to be replaced if the wear interferes with the engine performance.

SUMMARY

A method of controlling a variable vane assembly according to an exemplary aspect of the present disclosure includes, among other things, sensing a first angular deflection of a first array of variable vanes about a first vane axis, and a second angular deflection of a second array of variable vanes about a second vane axis, the first array of variable vanes axially spaced from the second array of variable vanes, and adjusting the angular deflection of one of the first and second arrays of variable vanes, based on the sensed angular deflections from the other of the first and second arrays of variable vanes.

In a further non-limiting embodiment of the foregoing method, the second array of variable vanes comprises inlet guide vanes.

In a further non-limiting embodiment of any of the foregoing methods, the method further includes the step of measuring an updated angular deflection of the first array of variable vanes with respect to the first vane axis subsequent to performing the adjusting step.

In a further non-limiting embodiment of any of the foregoing methods, the method includes measuring using rotary variable differential transformers.

In a further non-limiting embodiment of any of the foregoing methods, the method further includes the step of calculating whether the first array of variable vanes needs to be adjusted.

In a further non-limiting embodiment of any of the foregoing methods, the method includes calculating and adjusting steps using a full authority digital engine controller.

In a further non-limiting embodiment of any of the foregoing methods, the method includes adjusting with a bellcrank.

In a further non-limiting embodiment of any of the foregoing methods, the method further includes the step of inputting a desired angular deflection of the first array of variable vanes.

A compressor for a gas turbine engine according to an exemplary aspect of the present disclosure includes, among other things, a plurality of stages, each stage including a plurality of vane arms, wherein the vane arms each include a portion that engages a variable vane and are secured to at least one movable annular ring, at least one sensor arranged at each stage, the at least one sensor configured to measure an angular position of the variable vanes, and a controller configured adjust the at least one movable annular ring based on the angular position measured by the sensor.

In a further non-limiting embodiment of the foregoing compressor, the at least one movable annular ring includes first and second movable annular rings and the vane arms include first and second ends configured to be secured to the first and second annular rings, respectively.

In a further non-limiting embodiment of any of the foregoing compressors, the compressor further includes an actuator arranged at each stage, the actuator configured to move the at least one annular ring, thereby moving the variable vanes.

In a further non-limiting embodiment of any of the foregoing compressors, the controller controls the actuator of each stage independently.

In a further non-limiting embodiment of any of the foregoing compressors, the compressor further includes a plurality of inlet guide vanes arranged upstream from the foremost stage of the plurality of stages.

In a further non-limiting embodiment of any of the foregoing compressors, at least one of the plurality of inlet guide vanes includes an inlet guide vane sensor configured to determine an angular position of the at least one inlet guide vane.

In a further non-limiting embodiment of any of the foregoing compressors, the controller is configured to control the actuators based on information from the inlet guide vane sensor.

A method of controlling a variable vane assembly for a compressor, according to an exemplary aspect of the present invention includes, among other things, securing a first plurality of variable vanes to a plurality of vane arms, the vane arms secured to a first movable annular ring at a first end and a second movable annular ring at a second end, measuring an angular deflection of the first plurality of variable vanes with respect to a vane axis, and moving the first and second annular rings in response to the measured angular deflection of the first plurality of variable vanes.

In a further non-limiting embodiment of the foregoing method, the method further includes the step of measuring an angular deflection of a second plurality of variable vanes.

In a further non-limiting embodiment of any of the foregoing methods, the moving step is in response to the measured angular deflection of the second plurality of variable vanes.

In a further non-limiting embodiment of any of the foregoing methods, the second plurality of variable vanes are inlet guide vanes.

DETAILED DESCRIPTION

Figure 1:
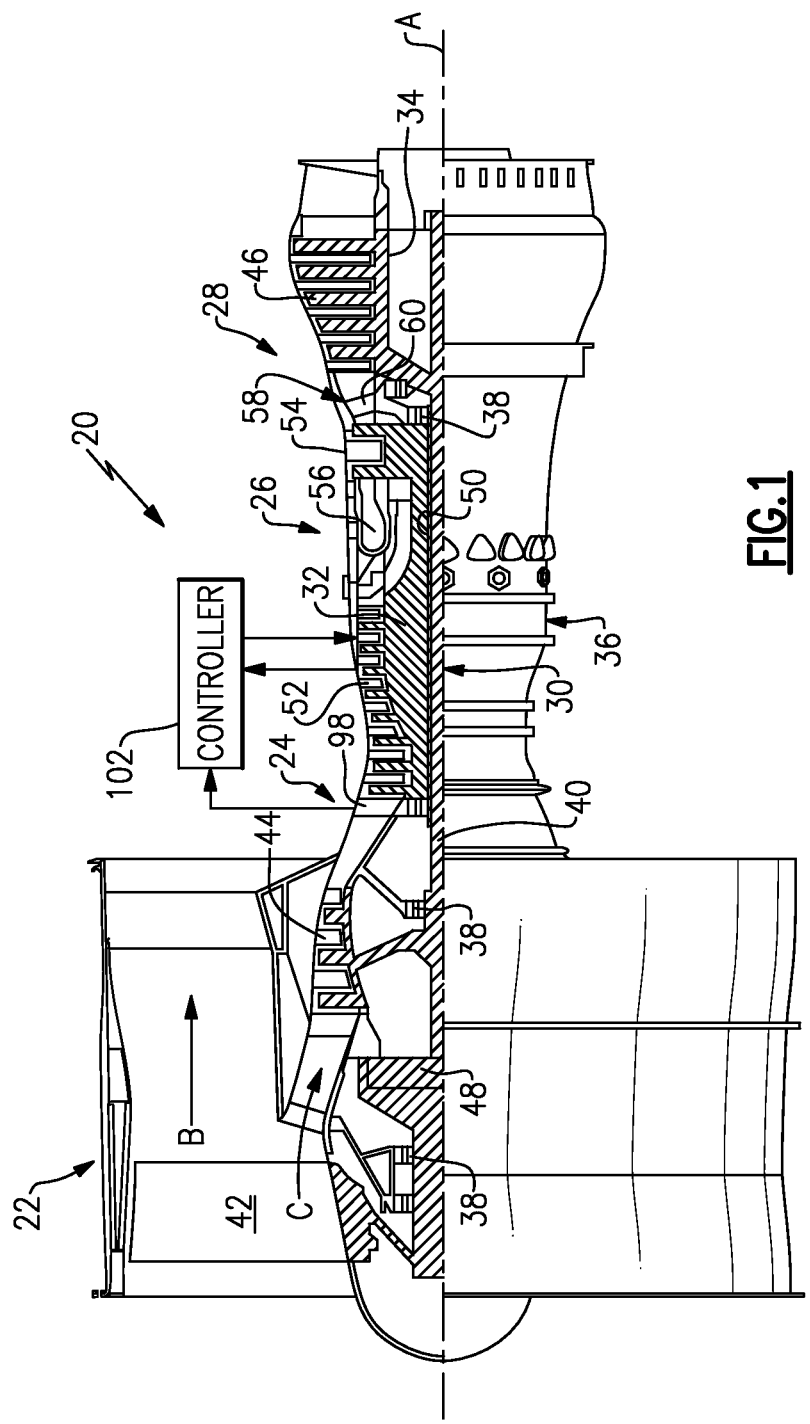
FIG. 1 schematically illustrates an example gas turbine engine with variable vane control system.

FIG. 1 schematically illustrates an example gas turbine engine 20 that includes a fan section 22, a compressor section 24, a combustor section 26, and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow flowpath C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6:1), with an example embodiment being greater than about ten (10:1). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by air in the bypass flowpath B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment, the low fan pressure ratio is less than about 1.45.

"Low corrected fan tip speed" is the actual fan tip speed in ft/sec divided by an industry standard temperature correction of $[(Tram\ °R)/(518.7°\ R)]^{0.5}$. The "Low corrected fan tip speed," as disclosed herein according to one non-limiting embodiment, is less than about 1150 ft/second.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment, the low pressure turbine 46 includes about three (3) turbine rotors. A ratio between the number of fan blades and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades in the fan section 22 disclose an example gas turbine engine 20 with increased power transfer efficiency.

Figure 2:
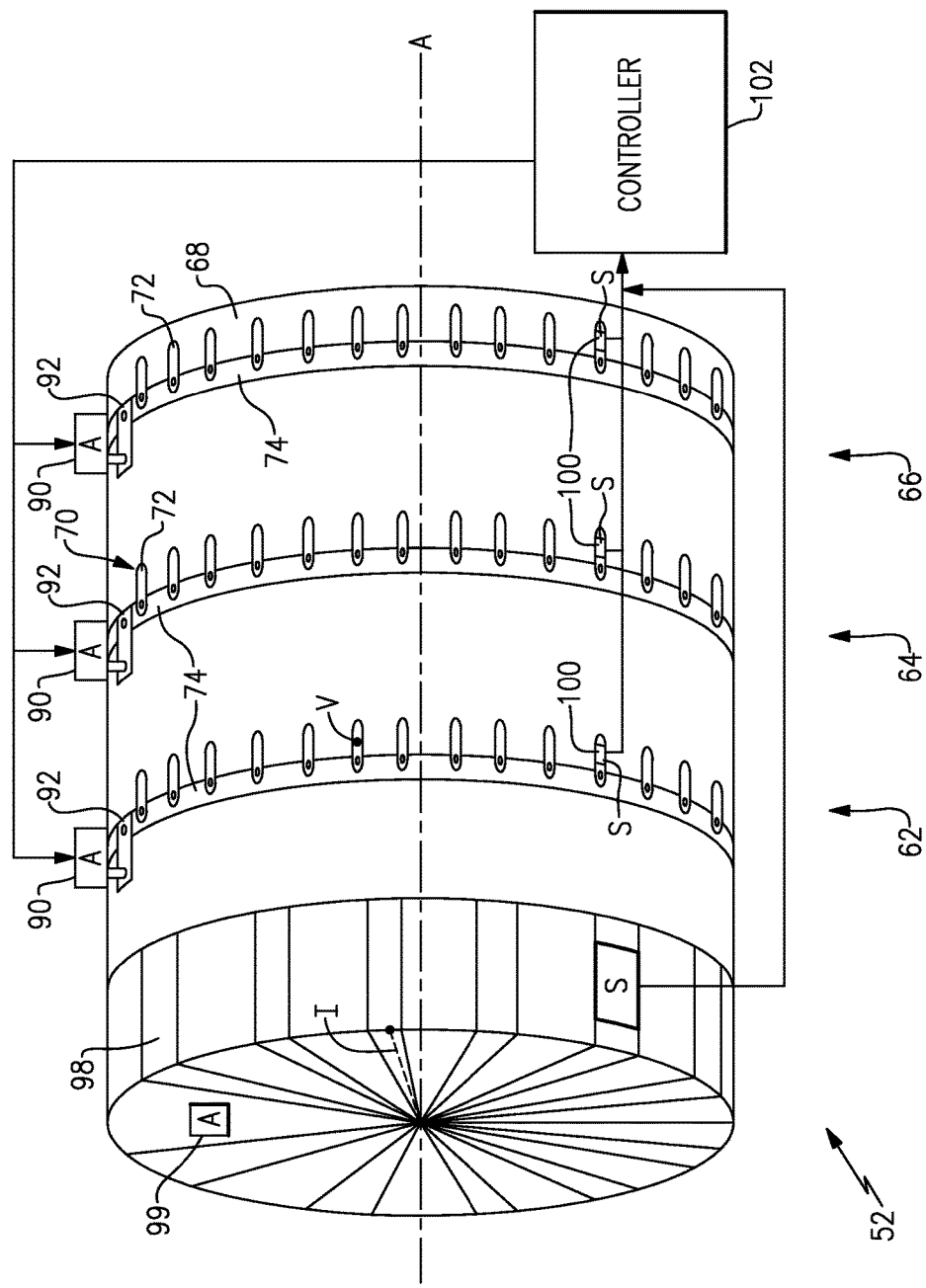
FIG. 2 schematically illustrates an example compressor with variable vane control system.

Referring to FIG. 2 with continuing reference to FIG. 1, the high pressure compressor 52 can include a compressor case 68 surrounding one or more stages. In the example shown in FIG. 2, the high pressure compressor 52 includes first, second, and third stages 62, 64, 66. The example high pressure compressor 52 includes inlet guide vanes (IGVs) 98, located at the compressor 52 inlet and extending radially relative to the engine axis A along an IGV axis I. The IGVs 98 help direct air into the high pressure compressor 52. The IGVs 98 are arranged upstream from the first compressor stage 62. In one example, the example IGVs 98 are a first set of variable vanes, pivotable along the IGV axis I, which extends radially out of the engine core axis A, by an actuator 99.

The high pressure compressor 52 includes second set of variable vanes 70 aft of the IGVs 98 extending radially relative to the engine axis A along a variable vane axis V. The variable vane axis V extends into the compressor parallel to IGV axis I. The variable vanes each have a vane arm 72 secured to a synchronizing ring (sync-ring) 74. The vane arm 72 is connected to a trunnion (not shown) which is in turn connected to an airfoil (not shown). The trunnion and airfoil extend radially into the compressor 52. As the sync-ring 72 rotates, the vane arm 72 is actuated such that it pivots about an axis of the trunnion. This in turn causes the trunnion and thus the airfoil to rotate about the same trunnion axis. Each stage 62, 64, 66 includes an actuator (A) 90, which is connected to a bellcrank 92. The bellcrank 92 is actuated by the actuator 90 to rotate the sync-ring 74, thus rotating the variable vanes 92.

In the disclosed embodiment, each of the stages 62, 64, 66 includes a sensor 100 on one or more of the variable vanes 70 in that stage. The sensors 100 measure the angular displacement of the variable vane 70 with respect to vane axis V. The IGVs 98 may also include a sensor 100 to measure the displacement of the IGVs 98 with respect to the IGV axis I. The sensors 100 are, for example, rotary variable differential transformers (RVDTs).

Displacement information for the variable vanes 70 and IGVs 98, measured from the sensors 100, is communicated to a controller 102. The controller 102 is, for example, an engine 20 controller, such as a full authority digital engine controller (FADEC). The controller 102 signals the actuators 90 to actuate the bellcranks 92, and adjusts the variable vanes 70 in response to the angular displacement information.

Figure 3:
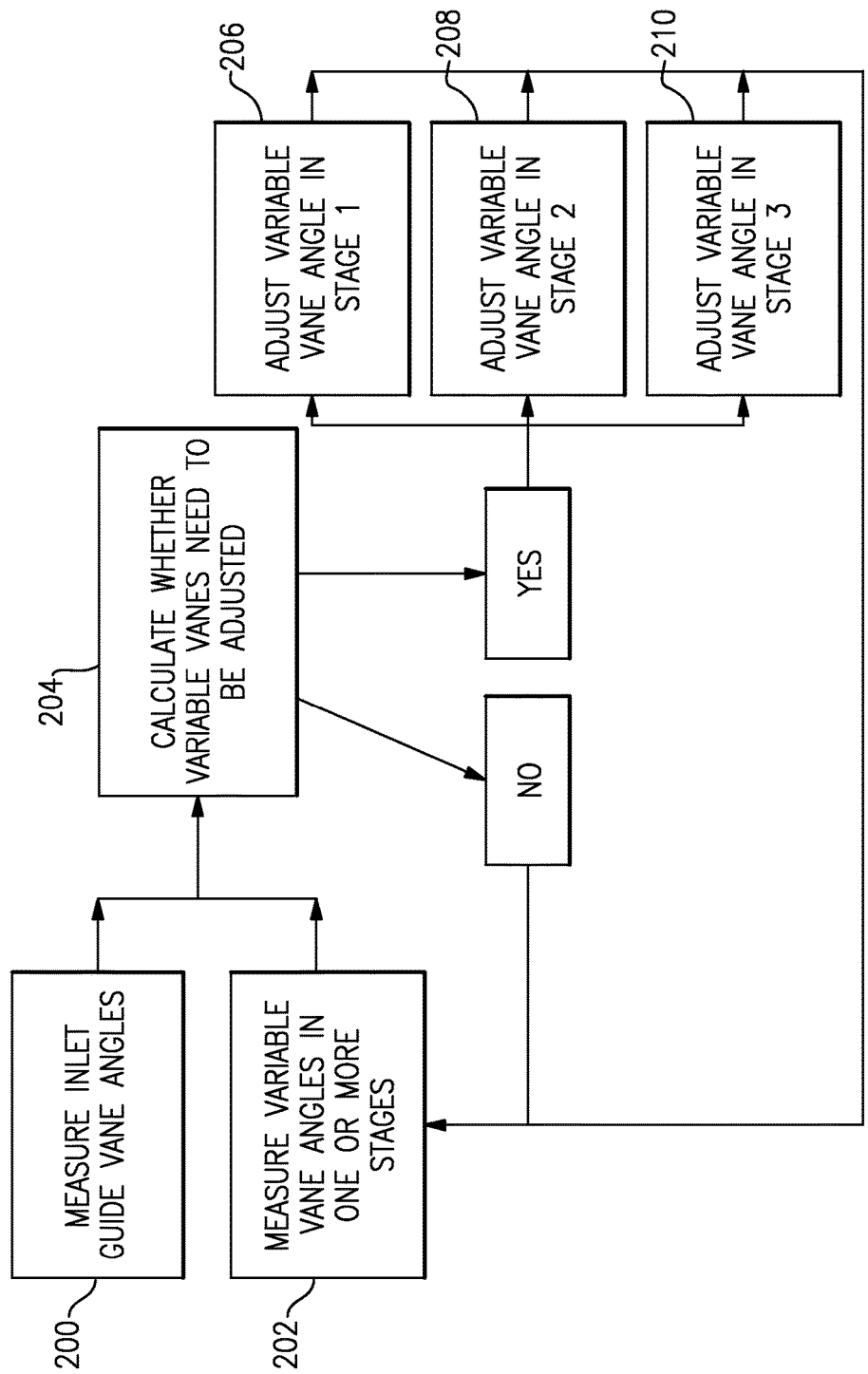
FIG. 3 illustrates a flowchart of method for controlling variable vanes.

Referring to FIG. 3 with continued reference to FIG. 2, a method for controlling variable vanes 70 within a compressor 52 is shown. In step 200, a displacement angle of IGVs 98 in the compressor 52 is measured. In step 202, a displacement angle of the variable vanes 70 aft of the IGVs 98 is measured. The displacement angle of the variable vanes 70 may be measured in selected compressor stages 62, 64, 66 or in every compressor stage 62, 64, 66.

In step 204, the controller 102 calculates whether the variable vanes 70 need to be adjusted. The variable vanes 70 may be adjusted to improve engine 20 efficiency. For example, the certain modes of operation for the engine 20, such as takeoff, landing, cruise, etc. may require certain variable vane 70 scheduling. Alternatively, variable vanes 70 may be rotated to provide a certain face for primary impingement of the air in the core air flowpath C through the compressor 52. For example, variable vanes 70 may experience wear on a first face and may then be rotated to provide a second face for impingement of the core air. Variable vanes 70 can wear for a variety of reasons, such as foreign object damage, erosion, and debris accumulation. A slight amount of wearing may occur from these various issues, though within acceptable guidelines, but which may impact efficiency; the impact of such wear can be lessened by rotating the variable vanes 70. This may increase the lifetime of the variable vanes 70.

If the variable vanes 70 do not need to be adjusted, as indicated by the "No" logic step 204a, the method returns to step 202. If the variable vanes 70 do need to be adjusted, as indicated by the "Yes" logic step 204b, then the method proceeds to steps 206, 208, and 210. In step 206 the variable vanes 70 in the first stage 62 are adjusted. In step 208, the variable vanes 70 in the second stage 64 are adjusted. In step 210, the variable vanes 70 in the third stage 66 are adjusted. The variable vanes 70 in each stage 62, 64, 66 may be adjusted independently of one another by the actuators 90. After adjustment, the method returns to step 200. This closed-loop feedback control method allows for infinite incremental adjustments of the variable vane 70 angles. That is, the variable vanes 70 can be adjusted to any position with the range of motion allowed by the bellcrank 92. Also, the control method allows for real time variable vane 70 adjustment during flight in response a user input such as a change in flight conditions. Alternatively, the variable vanes 70 may be automatically positioned at a certain angle based on the difference between the current variable vane 70 angle and a desired variable vane 70 angle.

Figure 4:
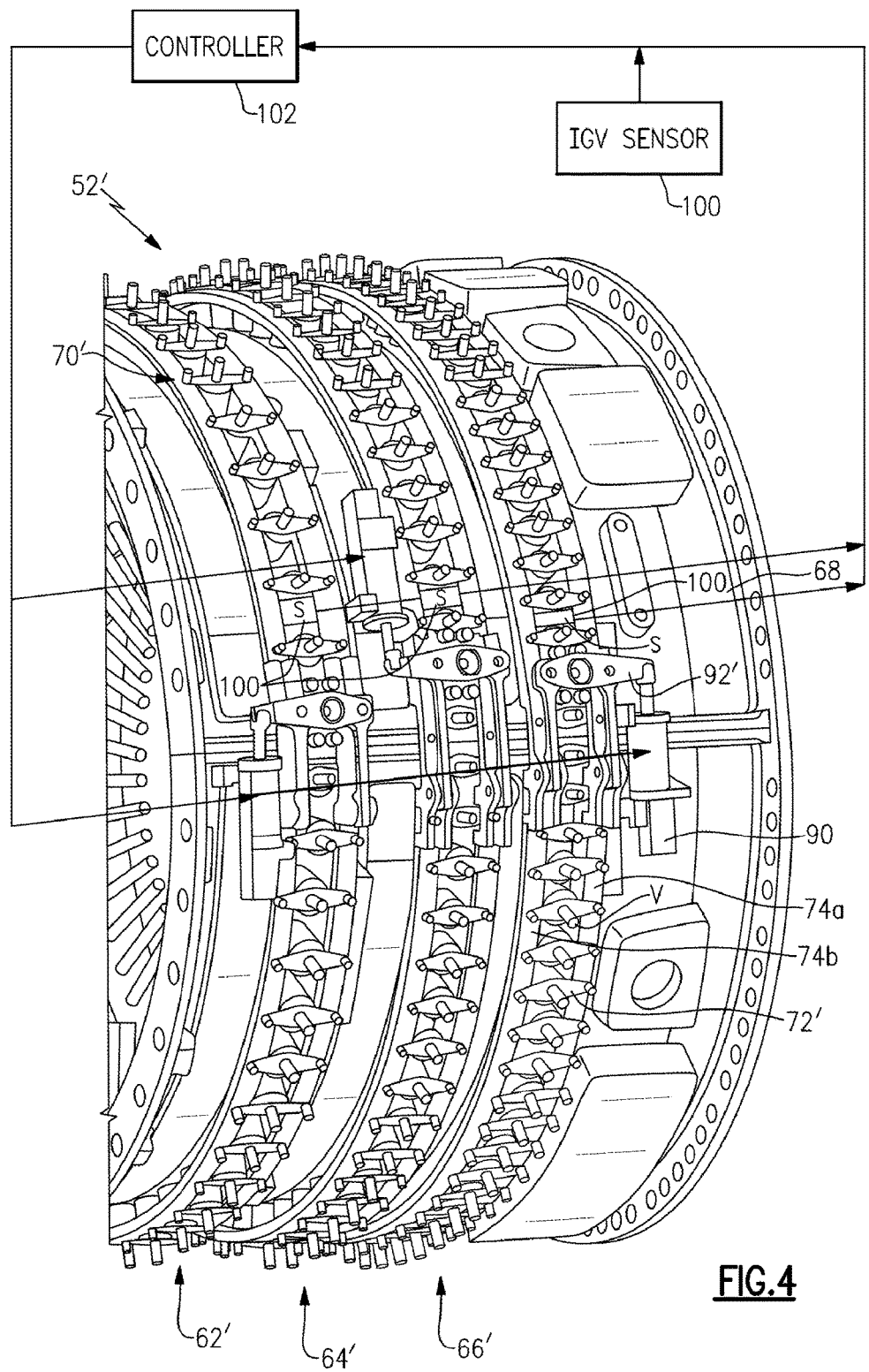
FIG. 4 illustrates a portion of alternate example compressor.

FIG. 4 shows an alternate compressor 52'. In the example of FIG. 4, each variable vane 70' includes a vane arm 72' which is connected to first and second sync-rings 74a, 74b at first and second ends of the vane arm 72', respectively. A bellcrank 92' is connected to the first and second sync-rings 74a, 74b. In operation, the sync-rings 74a, 74b are rotated circumferentially about the engine axis A (FIG. 1) by the actuator 90 via the bellcrank 92'. The sync-rings 74a, 74b are rotated in opposite directions. This provides circumferential forces to first and second ends of the vane arm 72', respectively. Applying these forces causes the vane arm 72' to pivot about a vane axis V. This in turn rotates the variable vane 70'. The method of FIG. 3 may be applied to the alternate compressor 52' as well.

While the variable vane actuation systems are described herein in the context of the high pressure compressor 52, 52', it should be understood that the variable vane actuation system may be used in other parts of the engine which include variable vanes, for example, the high or low pressure turbines 46, 54.

Although embodiments of this invention has been disclosed, a worker of ordinary skill in this art would recognize that certain modifications would come within the scope of this invention. For that reason, the following claims should be studied to determine the true scope and content of this invention.

The invention claimed is:

1. A method of controlling a variable vane assembly, comprising the steps of:
   sensing a first angular deflection of a first array of variable vanes about a first vane axis, and a second angular deflection of a second array of variable vanes about a second vane axis, the first array of variable vanes axially spaced from the second array of variable vanes;

calculating whether the first array of variable vanes needs to be adjusted; and adjusting the angular deflection of one of the first and second arrays of variable vanes, based on the sensed angular deflections from the other of the first and second arrays of variable vanes.

2. The method of claim 1, wherein the second array of variable vanes comprises inlet guide vanes.

3. The method of claim 1, further comprising the step of measuring an updated angular deflection of the first array of variable vanes with respect to the first vane axis subsequent to performing the adjusting step.

4. The method of claim 1, including measuring using rotary variable differential transformers.

5. The method of claim 1, including calculating and adjusting steps using a full authority digital engine controller.

6. The method of claim 1, including adjusting with a bellcrank.

7. The method of claim 1, further comprising the step of inputting a desired angular deflection of the first array of variable vanes.

8. A compressor for a gas turbine engine, comprising:
a plurality of stages, each stage including a plurality of vane arms, wherein the vane arms each include a portion that engages a variable vane and are secured to at least one movable annular ring, wherein at least one movable annular ring includes first and second movable annular rings and the vane arms include first and second ends configured to be secured to the first and second annular rings, respectively;
at least one sensor arranged at each stage, the at least one sensor configured to measure an angular position of the variable vanes; and
a controller configured adjust the at least one movable annular ring based on the angular position measured by the sensor.

9. The compressor of claim 8, further comprising an actuator arranged at each stage, the actuator configured to move the at least one annular ring, thereby moving the variable vanes.

10. The compressor of claim 9, wherein the controller controls the actuator of each stage independently.

11. The compressor of claim 8, further including a plurality of inlet guide vanes arranged upstream from the foremost stage of the plurality of stages.

12. The compressor of claim 11, wherein at least one of the plurality of inlet guide vanes includes an inlet guide vane sensor configured to determine an angular position of the at least one inlet guide vane.

13. The compressor of claim 12, wherein the controller is configured to control the actuators based on information from the inlet guide vane sensor.

14. A method of controlling a variable vane assembly for a compressor, comprising:
securing a first plurality of variable vanes to a plurality of vane arms, the vane arms secured to a first movable annular ring at a first end and a second movable annular ring at a second end;
measuring an angular deflection of the first plurality of variable vanes with respect to a vane axis; and
moving the first and second annular rings in response to the measured angular deflection of the first plurality of variable vanes.

15. The method of claim 14, further comprising the step of measuring an angular deflection of a second plurality of variable vanes.

16. The method of claim 15, wherein the moving step is in response to the measured angular deflection of the second plurality of variable vanes.

17. The method of claim 16, wherein the second plurality of variable vanes are inlet guide vanes.

* * * * *